US006534188B2

(12) United States Patent  
Sadvary et al.

(10) Patent No.: US 6,534,188 B2  
(45) Date of Patent: Mar. 18, 2003

(54) FILM-FORMING COMPOSITIONS HAVING IMPROVED SCRATCH RESISTANCE

(75) Inventors: Richard J. Sadvary, Pittsburgh, PA (US); Lawrence G. Anderson, Pittsburgh, PA (US); Dennis A. Simpson, Pittsburgh, PA (US); Thomas R. Hockswender, Gibsonia, PA (US); Masayuki Nakajima, Wexford, PA (US); Truman F. Wilt, Clinton, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 4 days.

(21) Appl. No.: 09/844,799

(22) Filed: Apr. 27, 2001

(65) Prior Publication Data

US 2001/0039324 A1 Nov. 8, 2001

Related U.S. Application Data

(60) Division of application No. 09/364,524, filed on Jul. 30, 1999, now Pat. No. 6,225,434, which is a continuation-in-part of application No. 08/986,812, filed on Dec. 8, 1997, now Pat. No. 6,033,545, and a continuation-in-part of application No. 08/904,597, filed on Aug. 1, 1997, now Pat. No. 5,939,491.

(51) Int. Cl.$^7$ ............................................. B32B 25/20
(52) U.S. Cl. ..................... 428/447; 528/29; 528/28; 528/31; 528/25; 525/479; 525/474; 525/453; 427/387
(58) Field of Search ................... 528/29, 28, 31, 528/25; 525/479, 474, 453; 428/447; 427/387

(56) References Cited

U.S. PATENT DOCUMENTS

| | | | |
|---|---|---|---|
| 2,527,590 A | 10/1950 | Speier ........................ 260/46.5 |
| 3,317,460 A | 5/1967 | Clark et al. ................. 260/46.5 |
| 3,398,174 A | 8/1968 | Barnes ..................... 260/448.2 |
| 3,986,997 A | 10/1976 | Clark ..................... 260/29.2 M |
| 4,025,456 A | 5/1977 | Litteral et al. ............... 252/351 |
| 4,027,073 A | 5/1977 | Clark .......................... 428/412 |
| 4,278,574 A | 7/1981 | Dworak et al. ............... 260/22 |
| 4,395,461 A | 7/1983 | Ching ......................... 428/412 |
| 4,410,594 A | 10/1983 | Olson ......................... 428/412 |
| 4,431,789 A | 2/1984 | Okazaki et al. .............. 528/15 |
| 4,432,850 A | 2/1984 | Moriarity et al. ........... 204/181 |
| 4,478,876 A | 10/1984 | Chung ....................... 427/54.1 |
| 4,498,929 A | 2/1985 | Robertson .................. 106/38.2 |
| 4,640,940 A | 2/1987 | Jacobine et al. ............. 522/99 |
| 4,689,383 A | 8/1987 | Riffle et al. .................. 528/12 |
| 4,732,929 A | 3/1988 | Chang et al. ................ 524/541 |
| 4,764,569 A | 8/1988 | Umemoto et al. ........... 525/446 |
| 4,808,649 A | 2/1989 | Gay et al. .................... 524/264 |
| 4,839,443 A | 6/1989 | Akutsu et al. ............... 525/474 |
| 4,891,111 A | 1/1990 | McCollum et al. ...... 204/181.7 |
| 4,925,659 A | 5/1990 | Grollier et al. ............... 424/78 |
| 5,035,748 A | 7/1991 | Burow et al. ................ 106/499 |
| 5,066,698 A | 11/1991 | Hazan et al. ................ 524/269 |
| 5,066,720 A | 11/1991 | Ohsugi et al. ............... 525/100 |
| 5,231,157 A | 7/1993 | Herzig et al. ................. 528/15 |
| 5,248,789 A | 9/1993 | Wolff .......................... 549/215 |
| 5,260,469 A | 11/1993 | Swiatek ....................... 556/445 |
| 5,268,256 A | 12/1993 | Goetz et al. ................. 430/284 |
| 5,395,955 A | 3/1995 | Okawa et al. ............... 556/449 |
| 5,427,661 A | 6/1995 | Geist et al. ............... 204/181.7 |
| 5,432,233 A | 7/1995 | Miyazoe et al. ............. 525/103 |
| 5,501,779 A | 3/1996 | Geist et al. .................. 904/501 |
| 5,547,608 A | 8/1996 | Harrison et al. ............ 252/357 |
| 5,599,883 A | 2/1997 | Ohsugi et al. ............... 525/474 |
| 5,614,640 A | 3/1997 | Okawa ........................ 549/215 |
| 5,686,012 A | 11/1997 | Hayashi et al. ........... 252/62.56 |
| 5,719,234 A | 2/1998 | Yabuta et al. ............... 525/101 |
| 5,756,221 A | 5/1998 | Horibe et al. ............... 428/626 |
| 5,798,409 A | 8/1998 | Ho ............................. 524/506 |
| 5,853,809 A | 12/1998 | Campbell et al. ......... 427/407.1 |
| 6,225,434 B1 | 5/2001 | Sadvary et al. ............. 528/29 |

FOREIGN PATENT DOCUMENTS

| | | | |
|---|---|---|---|
| DE | 1193504 | 5/1965 | |
| DE | 1545040 | 7/1970 | ........... B26B/21/54 |
| EP | 0 586 048 A1 | 6/1993 | ............ C09D/5/02 |
| GB | 1293331 | 1/1970 | ........... C08G/31/14 |
| JP | 3258866 A | 11/1991 | ............ A61K/7/00 |
| JP | 5065416 A | 3/1993 | ........... C08L/83/04 |
| JP | 9227688 A | 9/1997 | ........... C08G/77/38 |
| JP | 10017670 A | 1/1998 | ........... C08G/77/34 |
| WO | WO 95/28452 | 10/1995 | ......... C09D/133/14 |

OTHER PUBLICATIONS

"Synthesis of Novel Organic Oligomers Containing SI–H Bonds", T. Iwahara et al., *Journal of Polymer Science: Part A: Polymer Chemistry*, vol. 31, pp. 2617–2631 (1993).

"Siloxanes with aliphatic isocyanate groups. A tetrafunctional cross–linking agent", Guangbin Zhou et al., *Polymer Bulletin*, pp. 85–88 (1989).

"Regioselective Rhodium–Containing Catalysts for Ring–Opening Polymerizations and Hydrosilylations", J.V. Crivello et al., *Journal of Polymer Science: Part A: Polymer Chemistry*, vol. 30, pp. 1–11 (1992).

*Primary Examiner*—Robert Dawson
*Assistant Examiner*—Kuo-Liang Peng
(74) *Attorney, Agent, or Firm*—Deborah M. Altman; William J. Uhl

(57) ABSTRACT

Multi-component composite coating compositions are provided which comprise a base coat deposited from a pigmented film-forming composition and a transparent top coat applied over the base coat in which the transparent top coat is deposited from a film-forming composition comprising one ore more ungelled chain-extended organic polysiloxanes having reactive functional groups, and one or more curing agents having functional groups reactive with the functional groups of the polysiloxane. Additionally provided is a process for applying the multi-component composite coatings described above to a substrate. Substrates coated with the above-described multi-component composite coating compositions are also provided.

85 Claims, No Drawings

FILM-FORMING COMPOSITIONS HAVING IMPROVED SCRATCH RESISTANCE

CROSS-REFERENCE TO RELATED APPLICATIONS

This application is a Division of U.S. patent application Ser. No. 09/364,524 filed Jul. 30, 1999, now U.S. Pat. No. 6,225,434 which is a Continuation-in-Part of U.S. patent application Ser. No. 08/986,812 filed Dec. 8, 1997 (now U.S. Pat. No. 6,033,545) and U.S. patent application Ser. No. 08/904,597 filed Aug. 1, 1997 (now U.S. Pat. No. 5,939,491), all of which applications and patents are herein incorporated by reference in their entirety.

FIELD OF THE INVENTION

The present invention relates to curable compositions, particularly to curable film-forming compositions, comprising a functional group-containing organic polysiloxane component, which is a chain-extended reaction product, the compositions being characterized in that they provide cured compositions having high crosslink densities. More particularly, the invention relates to curable film-forming compositions which exhibit improved scratch resistance.

BACKGROUND OF THE INVENTION

Color-plus-clear coating systems involving the application of a colored or pigmented base coat to a substrate followed by application of a transparent or clear top coat over the base coat have become increasingly popular as original finishes for automobiles. The color-plus-clear systems have outstanding appearance properties such as gloss and distinctness of image due in large part to the clear coat.

Clear film-forming compositions, particularly those used to form the transparent top coat in color-plus-clear systems for automotive applications, are subject to damage from numerous environmental elements. Such elements include acidic precipitation, exposure to ultraviolet radiation from sunlight, high relative humidity and temperatures, and defects due to impact with small, hard objects resulting in chipping and scratching of the coating surface.

Typically, a harder more highly crosslinked film may exhibit improved scratch resistance, but it is much more susceptible to chipping and/or thermal cracking due to embrittlement of the film resulting from a high crosslink density. A softer, less crosslinked film, while not prone to chipping or thermal cracking, is susceptible to scratching, water spotting and acid etch due to a low crosslink density of the cured film.

U.S. patent application Ser. No. 08/904,597, filed Aug. 1, 1997 discloses curable compositions based on functional polysiloxanes, particularly hydroxyl functional group-containing polysiloxanes, which are suitable for use as clear coats in color-plus-clear systems for automotive applications. The functional group-containing polysiloxanes provide clear coatings with, inter alia, improved mar and acid etch resistance.

U.S. Pat. No. 5,853,809 discloses clear coats in color-plus-clear systems which have improved scratch resistance due to the inclusion in the coating composition of surface reactive inorganic microparticles such as colloidal silicas which have been modified with a reactive coupling agent. There, nonetheless, remains a need in the automotive coatings art for top coats having improved initial scratch resistance as well as enhanced post-weathering ("retained") scratch resistance without embrittlement of the film due to the high crosslink density.

SUMMARY OF THE INVENTION

In accordance with the present invention, multi-component composite coating compositions are provided which comprise a base coat deposited from a pigmented film-forming composition and a transparent top coat, or top coats, applied over the base coat in which the transparent top coat is deposited from a film-forming composition comprising:

(a) one or more ungelled organic polysiloxanes having reactive functional groups, said polysiloxane comprising at least one unit of the following structure (I):

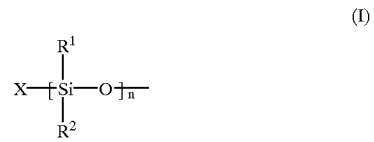

(I)

wherein $R^1$ and $R^2$ are independently selected from the group consisting of OH and monovalent hydrocarbon groups; X is an organic polyvalent linking group selected from the group consisting of alkylene, oxyalkylene, and alkylene aryl, which is derived from a material having two or more unsaturated bonds capable of undergoing hydrosilylation reaction; and n has a value ranging from 2 to 4 such that n is equal to the number of unsaturated bonds capable of undergoing hydrosilylation reaction; and (b) one or more curing agents having functional groups reactive with the functional groups of (a). A method for applying the multi-component composite coating composition to a substrate and coated substrates are also provided.

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers.

DETAILED DESCRIPTION OF THE PREFERRED EMBODIMENTS

As aforementioned, the transparent top coat of the multi-component composite coating of the present invention is deposited from a film-forming composition comprising: (a) an ungelled organic polysiloxane having reactive functional groups of he formula (I) above; and (b) a curing agent having functional groups reactive with the functional groups of the polysiloxane (a).

Preferably, the polysiloxane (a) comprises the ungelled reaction product of the following reactants (i) and (ii):

(i) one or more polysiloxanes containing silicon hydride having the structure (II):

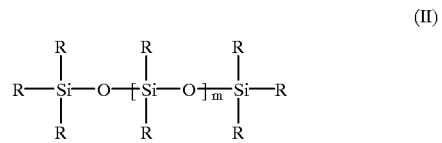

(II)

wherein the R groups are independently selected from the group consisting of H, OH, and monovalent hydrocarbon groups connected to the silicon atoms, provided at least one of the groups represented by R is H; and m has a value ranging from 0 to 100, preferably 0 to 5, such that the mole percent of hydrogen-bonded silicon atoms to non-hydrogen-bonded silicon atoms ranges from 10 to 100; and (ii) one or more materials having two or more, preferably two, unsaturated bonds capable of undergoing hydrosilylation reaction with the silicon hydride group (Si—H) of the polysiloxane. Preferably, reactant (ii) contains functional groups, most preferably, hydroxyl functional groups.

By "ungelled" is meant that the reaction products are substantially free of crosslinking and have an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of essentially infinitely high molecular weight, will have an intrinsic viscosity too high to measure.

It should be appreciated that the various R groups can be the same or different and it is usually the case that the R groups will be mixed groups or entirely monovalent hydrocarbon groups.

As used herein and in the claims, "monovalent hydrocarbon groups" means organic groups containing essentially carbon and hydrogen. The hydrocarbon groups can be branched or unbranched, aliphatic, aromatic, cyclic, or acyclic and can contain from 1 to 24 (in the case of aromatic from 3 to 24) carbon atoms. The hydrocarbon groups can be substituted with heteroatoms, for example, oxygen. Examples of such monovalent hydrocarbon groups include alkyl, alkoxy, aryl, alkaryl or alkoxyaryl groups.

By "alkylene" is meant acyclic or cyclic alkylene groups having a carbon chain length of from $C_2$ to $C_{25}$. Examples of suitable alkylene groups include those derived from propene, butene, pentene, 1-decene, isoprene, myrcene, and 1-heneicosene. By "oxyalkylene" is meant an alkylene group containing at least one ether oxygen atom and having a carbon chain length of from $C_2$ to $C_{25}$, preferably from $C_2$ to $C_4$. Examples of suitable oxyalkylene groups include those derived from trimethylolpropane monoallyl ether, pentaerythritol monoallyl ether, trimethylolpropane diallylether, polyethoxylated allyl alcohol, and polypropoxylated allyl alcohol. By "alkylene aryl" is meant an acyclic alkylene group containing at least one aryl group, preferably phenyl, and having an alkylene carbon chain length of from $C_2$ to $C_{25}$. The aryl group can be substituted, if desired. Suitable substituent groups include hydroxyl, benzyl, carboxylic acid, and aliphatic groups. Examples of suitable alkylene aryl groups include those derived from styrene and 3-isopropenyl-α,α-dimethylbenzyl isocyanate.

It should be understood that the ratio of reactants (i) and (ii) and reaction conditions are selected to produce a "chain extended" polysiloxane reaction product. The term "chain extended" as used herein is intended to mean that two or more organic polysiloxanes containing silicon hydride are linked or co-polymerized between at least one Si—H group of one polysiloxane containing silicon hydride and a Si—H group of another via a hydrosilylation reaction with a material having two or more unsaturated bonds capable of undergoing hydrosilylation reaction. To control molecular weight and prevent formation of a gelled reaction product, a material having only one unsaturated bond capable of undergoing hydrosilylation reaction is usually included as a reactant to serve as a "chain terminator". Examples of such materials which are suitable for use in the present invention include trimethylol propane monoallyl ether, pentaerythritol monoallyl ether, vinyl cyclohexane diol, styrene, and the like. Alternatively, to control molecular weight and to prevent formation of a gelled reaction product, a material having only one Si—H bond capable of undergoing hydrosilylation reaction can be included to serve as a "chain-terminator". Examples of suitable materials having only one Si—H capable of undergoing hydrosilylation reaction include trimethylsilane, triphenylsilane, and bis(trimethylsiloxy)methyl silane.

Preparation of the chain-extended organic polysiloxane typically is carried out in the following manner. An admixture of the material having only one unsaturated bond capable of undergoing hydrosilylation reaction and the material having at least two unsaturated bonds capable of undergoing hydrosilylation reaction is added to a reaction vessel equipped with a means for maintaining a nitrogen blanket. Added concurrently is approximately 25 to 75 ppm sodium bicarbonate or metal acetate salt to inhibit possible undesirable side reactions such as those associated with acetal condensation via a propenyl ether moiety. The temperature is increased to 75° to 80° C. under nitrogen, at which time 50 to 65 percent of the total amount of polysiloxane containing silicon hydride is added under agitation. A catalyst such as a transition metal, for example, nickel and/or salts thereof, iridium salts and, more preferably, a Group VIII noble metal, usually, platinum in the form of chloroplatinic acid, is then added and the reaction mixture is allowed to exotherm to 85° C. Generally, the exotherm can be controlled by adjusting rates of addition of the reactants. Addition of the remainder of the polysiloxane containing silicon hydride is completed as the reaction temperature is maintained at about 80° to 85° C. The chain-extension reaction is monitored by infrared spectroscopy for disappearance of the silicon hydride adsorption band (Si—H: 2150 cm$^{-1}$).

Alternatively, the material having only one unsaturated bond capable of undergoing hydrosilylation reaction and the material having at least two unsaturated bonds capable of undergoing hydrosilylation reaction are added as separate reactants. The former is added initially and is reacted with 50 to 65 percent of the total amount of polysiloxane containing silicon hydride in the presence of the catalyst. The ratio of these two reactants is selected such that, subsequent to hydrosilylation reaction, there remains an amount of unreacted Si—H available for subsequent chain-extension reaction. The material having at least two unsaturated bonds capable of undergoing hydrosilylation reaction is then added, and then addition of the remainder of the polysiloxane containing silicon hydride is completed as the reaction temperature is maintained at about 80° to 85° C. The chain-extension reaction is monitored by infrared spectroscopy for disappearance of the silicon hydride adsorption band.

In a preferred multi-component composite coating compositions of the invention, the equivalent ratio of Si—H to total unsaturation capable of undergoing hydrosilylation reaction ranges from 0.5 to 2:1.

It also should be noted that the level of unsaturation contained in reactant (ii) above, is selected to ensure an ungelled reaction product containing at least one unit of the structure (I) above. In other words, when a polysiloxane containing silicon hydride having a higher average value of Si—H functionality is used, reactant (ii) should have a lower level of unsaturation. For example, in a preferred embodiment of the invention, the polysiloxane containing silicon hydride (i) is a low molecular weight material where m ranges from 0 to 5 and the average value of Si—H functionality is approximately two. In this case, reactant (ii) can contain two or more, unsaturated bonds capable of undergoing hydrosilylation reaction without the occurrence of gelation.

Examples of the preferred polysiloxane containing silicon hydride include 1,1,3,3-tetramethyl disiloxane where m is 0 and the average Si—H functionality is two; and the polymethyl polysiloxane containing silicon hydride, where m ranges from 4 to 5 and the average Si—H functionality is about two, commercially available from BASF Corporation as MASILWAX BASE. Preferably, reactant (ii) contains at least two unsaturated bonds in the terminal position.

In a preferred embodiment, the reactive functional groups of the polysiloxane (a) are provided by reactant (ii) above. The reactive functional groups of the polysiloxane (a) are typically selected from the group consisting of hydroxyl, carbamate, urea, urethane, alkoxysilane, epoxy, isocyanate and blocked isocyanate and carboxylic acid functional groups. Hydroxyl and/or carbamate group-containing polysiloxanes are preferred.

To provide polysiloxanes having hydroxyl functional group, preferred materials for use as reactant (ii) above include hydroxyl functional group-containing polyallyl ethers such as those selected from the group consisting of trimethylolpropane diallyl ether, pentaerythritol diallyl ether, pentaerythritol triallyl ether and mixtures thereof. Trimethylolpropane diallyl ether is preferred. Mixtures of such polyallyl ethers with monoallyl ethers or alcohols are suitable as well. Reaction conditions and the ratio of reactants (i) and (ii) are selected so as to form the desired functional group.

Typically, the polysiloxane containing hydroxyl functional groups has a hydroxyl equivalent weight of at least 1000 grams per equivalent, preferably at least 500 grams per equivalent, and more preferably at least 250 grams per equivalent. The polysiloxane containing hydroxyl functional groups also typically has a hydroxyl equivalent weight of less than 1000 grams per equivalent, more preferably less than 500 grams per equivalent, and more preferably 250 grams per equivalent. The hydroxyl equivalent weight of the polysiloxane containing hydroxyl functional groups can range between any combination of these values inclusive of the recited values.

In another preferred embodiment of the invention, the polysiloxane (a) contains carbamate functional groups and, preferably, comprises the ungelled reaction product of the following reactants:

(i) one or more polysiloxanes containing silicon hydride of structure (II) above where R and m are as described above for that structure;

(ii) one or more hydroxyl functional group-containing materials having two or more unsaturated bonds capable of undergoing hydrosilylation reaction as described above; and (iii) one or more low molecular weight carbamate functional materials, preferably comprising the reaction product of an alcohol or glycol ether and a urea.

The carbamate functional groups typically are incorporated into the polysiloxane by reacting the hydroxyl functional group-containing polysiloxane with the low molecular weight carbamate functional material via a "transcarbamylation" process. The low molecular weight carbamate functional material, which is derived from an alcohol or glycol ether, reacts with the free hydroxyl groups of the polysiloxane, yielding a carbamate functional polysiloxane and the original alcohol or glycol ether. Reaction conditions and the ratio of reactants (i), (ii), and (iii) are selected so as to form the desired groups.

The low molecular weight carbamate functional material is usually prepared by reacting the alcohol or glycol ether with urea in the presence of a catalyst such as butyl stannoic acid. Suitable alcohols include lower molecular weight aliphatic, cycloaliphatic, and aromatic alcohols, for example, methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred. The incorporation of carbamate functional groups into the polysiloxane can also be achieved by reacting isocyanic acid with the free hydroxyl groups of the polysiloxane.

As aforementioned, in addition to or in lieu of hydroxyl and/or carbamate functional groups, the polysiloxane (a) can contain other reactive functional groups such as epoxy, isocyanate, and carboxylic acid functional groups. To form polysiloxanes containing epoxy functional groups, a polysiloxane containing hydroxyl functional groups as described above is further reacted with a polyepoxide. The polyepoxide is preferably an aliphatic or cycloaliphatic polyepoxide or mixtures thereof. Examples of polyepoxides suitable for use in the present invention include epoxy functional acrylic copolymers prepared from at least one ethylenically unsaturated monomer having at least one epoxy group, for example, glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

Isocyanate functional group-containing polysiloxanes typically are prepared by reacting a polysiloxane containing hydroxyl functional groups, as described above, with a polyisocyanate, preferably a diisocyanate. Examples of suitable polyisocyanates include aliphatic polyisocyanates, particularly aliphatic diisocyanates, for example 1,4-tetramethylene diisocyanate and 1,6-hexamethylene diisocyanate; cycloaliphatic polyisocyanates, for example, 1,4-cyclohexyl diisocyanate, isophorone diisocyanate and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729 at column 5, line 26 to column 6, line 28, incorporated herein by reference. Preferred are aliphatic or cycloaliphatic diisocyanates or mixtures thereof. Reaction conditions and the ratio of reactants are selected so as to form the desired functional groups.

Carboxylic acid functional group-containing polysiloxane, typically are prepared by reacting a polysiloxane containing hydroxyl functional groups, as described above, with a polycarboxylic acid or anhydride, preferably an anhydride. Examples of polycarboxylic acids suitable for use in the present invention include adipic acid, sebacic acid and dodecanedioic acid. Examples of anhydrides suitable for use in the present invention include hexahydrophthalic anhydride, methylhexahydrophthalic anhydride, phthalic anhydride, trimellitic anhydride, succinic anhydride, chlorendic anhydride, alkenyl succinic anhydride, and substituted alkenyl anhydride such as octenyl succinic anhydride and mixtures thereof. Reaction conditions and the ratio of reactants are selected so as to form the desired functional groups.

The polysiloxane containing reactive functional groups (a) typically is present in the film-forming compositions of the present invention in an amount of at least 2 to 90 percent by weight, preferably at least 20 to 80 percent by weight, and more preferably at least 40 to 60 percent by weight based on the total weight of resin solids in the film-forming composition. The polysiloxane containing reactive functional groups (a) is also typically present in the film-forming compositions of the present invention in an amount less than 90 to 2 percent by weight, preferably less than 80 to 20 percent by weight, and more preferably less than 60 to 40 percent by weight based on the total weight of resin solids in the film-forming compositions. The amount of the polysiloxane containing reactive functional groups (a) present in the film-forming compositions of the invention can range between any combination of these values inclusive of the recited values.

As discussed above, besides the polysiloxane containing reactive functional groups (a), the film-forming compositions of the invention comprise (b) one or more curing agents having functional groups which are reactive with the functional groups of the polysiloxane (a). Non-limiting examples of suitable curing agents include aminoplasts, polyisocanates, triazines, polyepoxides, polyacids, and polyols. Where appropriate, mixtures of these curing agents can be used.

Preferably, the curing agent (b) is an aminoplast. Aminoplast resins, which include phenoplasts, as curing agents for hydroxyl, carboxylic acid, and carbamate functional group-containing materials are well known in the art. Aminoplasts are obtained from the condensation reaction of formaldehyde with an amine or amide. Preferred amines or amides include melamine, urea, or benzoguanamine. However, condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast contains imino and methylol groups and preferably at least a portion of the methylol groups are etherified with an alcohol to modify the cure response. Any monohydric alcohol can be employed for this purpose including methanol, ethanol, n-butyl alcohol, isobutanol, and hexanol, with methanol, n-butyl alcohol, and isobutanol being preferred.

Preferred aminoplasts include melamine-, urea-, or benzoguanamine-formaldehyde condensates, preferably monomeric, and at least partially etherified with one or more alcohols containing from one to four carbon atoms. Suitable aminoplast resins are commercially available from Cytec Industries under the trademark CYMEL and from Solutia, Inc. under the tradename RESIMENE.

The aminoplast curing agent is typically present in the film-forming composition in amounts ranging from 5 to 75, preferably from 20 to 60 percent, and more preferably from 40 to 60 percent by weight based on the total weight of resin solids in the film-forming composition.

Other curing agents suitable for use in the film-forming compositions of the present invention include polyisocyanate curing agents, for example, capped polyisocyanates. The polyisocyanate can be an aliphatic or an aromatic polyisocyanate or a mixture of the two. Diisocyanates can be used, although higher polyisocyanates such as isocyanurates of diisocyanates are preferred. Higher polyisocyanates can also be used in combination with diisocyanates. Isocyanate prepolymers, for example, reaction products of polyisocyanates with polyols can also be used.

If the polyisocyanate is capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is present in an amount ranging from 5 to 65 percent, preferably from 10 to 45 percent, and more preferably from 15 to 40 percent by weight based on the total weight of resin solids in the film-forming composition.

Useful adjuvant curing agents include triazines such as the tricarbamoyl triazine compounds which are described in detail in U.S. Pat. No. 5,084,541 which is incorporated herein by reference. When used, the adjuvant triazine curing agent is present in the film-forming composition in an amount ranging up to about 20, and preferably from about 1 to 20, percent by weight based on the total weight of resin solids in the film-forming composition.

Anhydrides as curing agents for hydroxyl functional group-containing materials are also well known in the art. Anhydrides suitable for use as curing agents in the film-forming compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Examples of suitable ethylenically unsaturated carboxylic acid anhydrides include maleic anhydride, citraconic anhydride, and itaconic anhydride, with maleic anhydride being preferred. Alternatively, the anhydride can be an anhydride adduct of a diene polymer, such as, maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both incorporated herein by reference.

Polyepoxides as curing agents for carboxylic acid functional group-containing materials are well known in the art. Examples of polyepoxides suitable for use in the film-forming compositions of the invention include polyglycidyl ethers of polyhydric phenols and of aliphatic alcohols which can be prepared by etherification of the polyhydric phenol or aliphatic alcohol with an epihalohydrin such as epichlorohydirn in the presence of alkali. These and other suitable polyepoxides are described in U.S. Pat. No. 4,681,811 at column 5, lines 33 to 58, incorporated herein by reference.

Suitable curing agents for epoxy functional group-containing materials include polyacid curing agents, such as the acid group-containing acrylic polymers prepared from an ethylenically unsaturated monomer containing at least one carboxylic acid group and at least one ethylenically unsaturated monomer containing no carboxylic acid groups. Such acid functional acrylic polymers preferably have an acid number ranging from 30 to 150. Acid functional group-containing polyesters can be used as well. The above-described polyacid curing agents are described in further detail in U.S. Pat. No. 4,681,811 at column 6, line 45 to column 9, line 54, incorporated herein by reference.

Also well known in the art as curing agents for isocyanate functional group-containing materials are polyols, that is, materials having an average of two or more hydroxyl groups per molecule. Examples of such materials suitable for use in the film-forming compositions of the invention include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol, and the like. Polyester polyols can also be used. These and other suitable polyacid curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference. Polyamines can also be used as curing agents for isocyanate functional group-containing materials. Examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Exemplary suitable aliphatic, and alicyclic diamines include 1,2-ethylene diamine, 1,2-propylene diamine, 1,8-methane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, incorporated herein by reference.

In a preferred embodiment, the transparent top coat is deposited from a film-forming composition which further comprises, as component (c), one or more polymers having reactive functional groups. The polymer (c) typically contains reactive functional groups selected from the group consisting of hydroxyl, carbamate, epoxy, isocyanate, carboxylic acid functional groups, and combinations or mixtures thereof. Hydroxyl and/or carbamate functional group-containing polymers are preferred.

Suitable hydroxyl group-containing polymers (c) include acrylic polyols, polyester polyols, polyurethane polyols, polyether polyols, and mixtures thereof. Preferably the polymer (c) is an acrylic polyol having a hydroxyl equivalent weight ranging from 100 to 1000 grams per equivalent, preferably 150 to 500 grams per equivalent.

Suitable hydroxyl group and/or carboxyl group-containing acrylic polymers can be prepared from polymerizable ethylenically unsaturated monomers, and are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene and vinyl toluene. As used herein and in the claims, by "(meth)acrylate" and the like terms is meant both acrylates and methacrylates.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Also, hydroxyl functional acrylic polymers can be reacted with isocyanic acid to provide pendent carbamate groups. Likewise, hydroxyl functional acrylic polymers can be reacted with urea to provide pendent carbamate groups therefrom.

The polymers prepared from polymerizable ethylenically unsaturated monomers can be prepared by solution polymerization techniques, which are well known to those skilled in the art, in the presence of suitable catalysts such as organic peroxides or azo compounds, for example, benzoyl peroxide or N,N-azobis(isobutyronitrile). The polymerization can be carried out in an organic solution in which the monomers are soluble by techniques conventional in the art. Alternatively, these polymers can be prepared by aqueous emulsion or dispersion polymerization techniques which are well known in the art. The ratio of reactants and reaction conditions are selected to result in an acrylic polymer with the desired pendent functionality.

Polyester polymers are also useful in the film-forming compositions of the invention as the polymer (c). Useful polyester polymers typically include the condensation products of polyhydric alcohols and polycarboxylic acids. Suitable polyhydric alcohols include ethylene glycol, neopentyl glycol, trimethylolpropane, and pentaerythritol. Suitable polycarboxylic acids include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used, and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamylation reaction. Preparation of suitable carbamate functional group-containing polyesters is those described in U.S. Pat. No. 5,593,733 at column 2, line 40 to column 4, line 9, incorporated herein by reference.

Polyurethane polymers containing terminal isocyanate or hydroxyl groups also can be used as the polymer (c) in the film-forming compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28. Examples of suitable polyols include those described in U.S. Pat. No. 4,046,729 at column 7, line 52 to column 10, line 35. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate, and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formula:

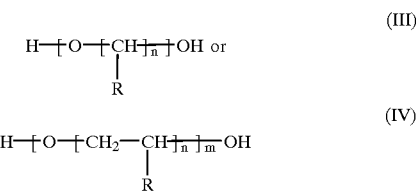

where the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Generally, the polymers having reactive functional groups (c) useful in the film-forming compositions of the invention have a weight average molecular weight (Mw) typically ranging from 1000 to 20,000, preferably 1500 to 15,000, and more preferably 2000 to 12,000 as determined by gel permeation chromatography using a polystyrene standard.

The polymer having reactive functional groups (c), when employed, can be present in the film-forming compositions of the invention in an amount of at least 0 to 80 percent by weight, preferably at least 5 to 60 percent by weight, and more preferably at least 10 to 50 percent by weight based on weight of total resin solids in the film-forming composition. Also, the polymer having reactive functional groups (c) is present in the film-forming compositions of the invention in an amount typically less than 80 percent by weight, preferably less than 60 to 5 percent by weight, and more preferably less than 50 to 10 percent by weight based on weight of total resin solids in the film-forming composition. The amount of the polymer having reactive functional groups (c) present in the film-forming compositions of the invention may range between any combination of these values inclusive of the recited values.

It should be mentioned that when both the polysiloxane (a) and the polymer (c) are present, the reactive functional groups of (a) and (c) can be the same or different so long as both contain reactive functional groups which are reactive with the functional groups of the curing agent (b).

The components (a), (b) and, if employed, (c) which comprise the inventive film-forming compositions, are generally dissolved or dispersed in an organic solvent. Suitable organic solvents include, for example, alcohols, ketones, aromatic hydrocarbons, glycol ethers, esters, or mixtures thereof. In solvent based coating compositions, the organic solvent typically is present in amounts ranging from 5 to 80 percent by weight based on total weight of the composition.

The film-forming composition preferably also contains a catalyst to accelerate the cure reaction, for example, between the aminoplast curing agent and the reactive hydroxyl and/or carbamate functional groups of the polysiloxane (a) and, if present, the polymer (c). Examples of suitable catalysts include acidic materials, for example, acid phosphates, such as phenyl acid phosphate, and substituted or unsubstituted sulfonic acids such as dodecylbenzene sulfonic acid or paratoluene sulfonic acid. The catalyst usually is present in an amount ranging from 0.1 to 5.0 percent by weight, preferably 0.5 to 1.5 percent by weight, based on the total weight of resin solids.

Optional ingredients, for example, plasticizers, surfactants, thixotropic agents, anti-gassing agents, organic cosolvents, flow controllers, anti-oxidants, UV light absorbers, and similar additives conventional in the art can be included in the composition. These ingredients typically are present in an amount of up to about 40 percent by weight based on the total weight of resin solids.

The film-forming composition of the present invention can be solvent-borne or water-borne. Preferably, the composition is solvent-borne. Suitable solvent carriers include the various alcohols, esters, ethers, aromatic solvents, and other solvents, including mixtures thereof, as are known in the art of coating formulation. The film-forming composition typically has a total solids content of 40 to 75 percent by weight based on total weight of the film-forming composition. Alternatively, the inventive film-forming composition can be in a solid particulate form suitable for use as powder coating.

In a preferred embodiment of the invention, the transparent top coat is deposited from a film-forming composition which further comprises substantially inorganic microparticles which are dispersed in the film-forming composition. The inorganic microparticles, prior to dispersion, have an average diameter ranging from 1 to 1000 nanometers, preferably from 2 to 200 nanometers, and more preferably from 4 to 50 nanometers. Prior to incorporation, the preferred inorganic microparticles are in the form of a sol, preferably an organosol, of the microparticles.

The substantially inorganic microparticles suitable for use in the film-forming compositions of the invention can comprise, for example, a core of essentially a single inorganic oxide such as silica in colloidal, fumed, or amorphous form; alumina; or an inorganic oxide of one type on which is deposited an inorganic oxide of another type. The suitable substantially inorganic microparticles, however, must be substantially colorless so as to not seriously interfere with the light transmissive properties of the transparent film-forming composition of the present invention. Suitable inorganic microparticles include colloidal silicas, such as those commercially available from Nissan Chemical Company under the tradename ORGANOSILICASOLS and from Clariant Corporation under the tradename HIGHLINK, colloidal alumina available as NALCO 8676 from Nalco Chemical, and colloidal zirconia available as HIT-32M from Nissan Chemical Company.

Additionally, it should be understood that although the substantially inorganic microparticles may be discrete or associated through physical and/or chemical means into aggregates, and although a given sample of the microparticles generally will have particles falling into a range of particle sizes, the substantially inorganic microparticles preferably have an average diameter in the range of from 1 to 150 nanometers. Prior to incorporation, the microparticles used as starting material should be in a form which will permit the formation of a stable dispersion in the film-forming composition.

As used herein, by "stable dispersion" is meant that the substantially inorganic microparticles remain uniformly suspended throughout the liquid phase of the film-forming coating composition. Upon standing at ambient conditions of temperature and pressure, the dispersions do not flocculate or form a hard sediment. If over time some sedimentation occurs, it can be easily redispersed with low shear stirring using conventional paint mixing techniques.

A particularly desirable class of substantially inorganic microparticles include sols of a wide variety of small-particle, colloidal silicas having an average diameter of from 1 to 1000 nanometers, preferably from 2 to 200 nanometers, and more preferably from 4 to 50 nanometers, which silicas have been surface modified during and/or after the particles are initially formed. Such materials can be prepared by a variety of techniques in various forms, examples of which include organosols and mixed sols. As used herein the term "mixed sols" is intended to include those dispersions of colloidal silica in which the dispersing medium comprises both an orgainc liquid and water. Such small particle colloidal silicas are readily available, are essentially colorless, and have refractive indices which permit their inclusion in transparent coating compositions.

Such surface modified silicas inclulde common colloidal forms having ultimate particles of silica which, at least prior to incorporation in the coating composition, may contain on the surface chemically bonded carbon-containing moieties, as well as such groups as anhydrous $SiO_2$ groups and SiOH groups, various ionic groups physically associated or chemically bonded within the surface of the silica, adsorbed organic groups and combinations thereof, depending on the characteristics of the particular silica desired.

The microparticles can be reactive with the binder either by their inherent reactivity (e.g., via the presence of SiOH groups) or this reactivity can be converted using one of a wide range of alkoxy silane coupling agents (e.g., glycidyl alkoxy silanes, isocyanate alkoxy silanes, amino alkoxy silanes, and carbamyl alkoxy silanes). The reactive groups on the silica allow the silica to be reactive with the reactive groups of the film-forming polymer(s) without additional treatment when suitable curing agent is used. Where the silica surface is non-reactive with the reactive groups of the film-forming polymer(s) or curing agent(s), the inorganic particles can be reacted with a coupling agent which comprises a compound having a functionality capable of covalently bonding to the inorganic particles and having a functionality capable of crosslinking with the reactive groups of the film-forming polymer(s) where both functionalities are reacted onto a backbone of the coupling agent. The backbone of the coupling agent is a polyvalent linking group. Examples of the polyvalent linking group include polyvalent radicals such as silicone and phosphorous, alkyl groups, oligomers or polymers such as acrylic, urethane, polyester, polyamide, epoxy, urea, and alkyd oligomers and polymers. Examples of the functionality that reacts with the inorganic particle include hydroxyl, hydroxy ether, phenoxy, silane, and aminoplast functionalites. The above-described surface-modified silicas are described in detail in U.S. Pat. No. 5,853,809 at column 6, line 51 to column 8, line 43, incorporated herein by reference.

As aforementioned, the multi-component composite coating compositions of the present invention comprise a pigmented film-forming composition serving as a base coat (i.e., a color coat) and a film-forming composition applied over the color coat serving as a transparent topcoat (i.e., a clear coat). The base coat and clear coat compositions used in the multi-component composite coating compositions of the invention are preferably formulated into liquid high solids coating compositions, that is, compositions containing 40 percent, preferably greater than 50 percent by weight resin solids. The solids content is determined by heating a sample of the composition to 105° to 110° C. for 1 to 2 hours to drive off the volatile material, and subsequently measuring relative weight loss. Although the compositions are preferably liquid coating compositions, they can also be formulated as powder coating compositions.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The resinous binders for the base coat can be organic solvent-based materials such as those described in U.S. Pat. No. 4,220,679, note column 2, line 24 continuing through column 4, line 40. Also, water-based coating compositions such as those described in U.S. Pat. No. 4,403,003, U.S. Pat. No. 4,147,679 and U.S. Pat. No. 5,071,904 can be used as the binder in the base coat composition.

The base coat composition contains pigments as colorants. Suitable metallic pigments include aluminum flake, copper bronze flake and metal oxide coated mica. Besides the metallic pigments, the base coat compositions can contain non-metallic color pigments conventionally used in surface coatings including inorganic pigments such as titanium dioxide, iron oxide, chromium oxide, lead chromate, and carbon black; and organic pigments such as phthalocyanine blue and phthalocyanine green.

Optional ingredients in the base coat composition include those which are well known in the art of formulating surface coatings and include surfactants, flow control agents, thixotropic agents, fillers, anti-gassing agents, organic co-solvents, catalysts, and other customary auxiliaries. Examples of these materials and suitable amounts are described in U.S. Pat. No. 4,220,679, U.S. Pat. No. 4,403,003, U.S. Pat. No. 4,147,769 and U.S. Pat. No. 5,071,904.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, the film thickness of the base coat formed on the substrate is typically 0.1 to 5 mils (about 2.54 to about 127 microns), preferably 0.1 to 2 mils (about 2.54 to about 50.4 microns).

After forming a film of the base coat on the substrate, the base coat can be cured or alternatively given a drying step in which solvent is driven out of the base coat film by heating or an air drying period before application of the clear coat. Suitable drying conditions will depend on the particular base coat composition, and on the ambient humidity if the composition is water-borne, but in general, a drying time of from about 1 to 15 minutes at a temperature of about 75° to 200° F. (21° to 93° C.) will be adequate.

The transparent top coat (or clear coat) composition is typically applied to the base coat by spray application, however, the top coat can be applied by any conventional coating technique as described above. Any of the known spraying techniques can be used such as compressed air spraying, electrostatic spraying, and either manual or automatic methods. As mentioned above, the clear top coat can be applied to a cured or dried base coat before the base coat has been cured. In the latter instance, the two coatings are then heated to cure both coating layers simultaneously. Typical curing conditions range from 100° to 475° F. (39° to 246° C.) for 1 to 30 minutes. The clear coating thickness (dry film thickness) is typically 1 to 6 mils (about 25.4 to about 152.4 microns).

In an alternative embodiment of the invention, a second top coat film-forming composition is applied to the first top coat to form a "clear-on-clear" top coat. The first top coat film-forming composition is applied over the base coat as described above. The second top coat film-forming composition can be applied to a cured or to a dried first top coat before the base coat and first top coat have been cured, i.e., a wet-on-wet" application. The base coat, the first top coat and the second top coat can then be heated to cure the three coatings simultaneously.

It should be understood that the second transparent top coat and the first transparent top coat film-forming compositions can be the same or different provided that, when applied wet-on-wet, one top coat does not substantially interfere with the curing of the other. The first transparent top coat film-forming composition can be virtually any transparent top coating film-forming composition known to those skilled in the art. The first transparent top coat composition can be water-borne or solventborne, or, alternatively, in solid particulate form, i.e., a powder coating. Preferably it is solventborne.

Examples of suitable first top coating compositions include crosslinkable film-forming compositions comprising at least one thermosettable film-forming material and at least one curing agent. Suitable waterborne clearcoats are disclosed in U.S. Pat. No. 5,098,947 (incorporated by reference herein) and are based on water soluble acrylic resins. Usefil solvent borne clearcoats are disclosed in U.S. Pat. Nos. 5,196,485 and 5,814,410 (incorporated by reference herein) and include polyepoxides and polyacid curing agents. Suitable powder clearcoats are described in U.S. Pat. No. 5,663,240 (incorporated by reference herein) and include epoxy functional acrylic copolymers and polycarboxylic acid curing agents.

Typically, after forming the first top coat over the base coat, the first top coat is given a drying step in which solvent is driven out of the film by heating or, alternatively, an air drying period before application of the second top coat. Suitable drying conditions will depend on the particular first top coat composition, and on the ambient humidity if the composition is water-borne, but, in general, a drying time from 1 to 15 minutes at a temperature of 75° to 200° F. (21° to 93° C.) will be adequate.

The second top coat film-forming composition can be applied as described above for the first top coat by any conventional coating application technique. Typical curing conditions are those described above for the top coat. The second top coating dry film thickness typically ranges from 0.3 to 3 mils (7.5 micrometers to 75 micrometers), preferably from 0.5 to 2 mils (12.5 micrometers to 50 micrometers).

The multi-component composite coating compositions can be applied over virtually any substrate including wood, metals, glass, cloth, plastic, foam, including elastomeric substrates and the like. They are particularly useful in applications over metals and elastomeric substrates that are found on motor vehicles where they exhibit excellent appearance properties and improved mar and scratch resistance properties as evaluated by measuring the gloss of coated substrates before and after abrading of the coated substrates using a consistent laboratory method.

Illustrating the invention are the following examples which, however, are not to be considered as limiting the invention to their details. Unless otherwise indicated, all parts and percentages in the following examples, as well as throughout the specification, are by weight.

EXAMPLES

Examples A and B describe the preparation of a chain-extended disiloxane polyol and a pentasiloxane polyol, respectively, which are useful in the film-forming compositions of the invention. Comparative Example 1 describes the preparation of a control film-forming composition which uses a conventional acrylic polyol (as opposed to the inventive polysiloxane polyols) and an aminoplast curing agent. Examples 2 and 3 describe the preparation of analogous film-forming compositions of the present invention which contain the polysiloxane polyols of Examples A and B, respectively.

Example A

This example describes the preparation of a chain-extended disiloxane polyol used in the film-forming compositions of the present invention. The disiloxane polyol was prepared as follows: To a suitable reaction vessel flushed with $N_2$ was added 930.0 g of trimethylolpropane diallyl ether and 1.2085 mL of karsted catalyst. Over the following 4 hour period, 698.8 g of 1,1,3,3-tetramethyl disiloxane was added to the reaction mixture and the temperature was increased and held at approximately 50° C. When about half of the total amount of trimethylolpropane diallyl ether had been added, 198.4 g of allyl glycidyl ether was added over a period of about 4 hours. When the additions were complete, the reaction was held for 2 hours at which time 71.4 g of allyl glycidyl ether were added over a period of 0.5 hour. The reaction temperature was maintained at 50° C. for an additional 2 hours while the reaction was monitored by infrared spectroscopy for disappearance of the silicon hydride absorption band (Si—H, 2150 $cm^{-1}$). The reaction temperature was cooled to ambient temperature at which time 258.7 g of diethanolamine was added. The temperature was increased to 125° C. and the reaction mixture was maintained at that temperature for a period of about 2 hours.

Example B

This example describes the preparation of a chain-extended pentasiloxane polyol used in the film-forming compositions of the present invention. The pentasiloxane polyol was prepared as follows: To a suitable reaction vessel flushed with $N_2$ was added 62.0 of trimethylolpropane diallyl ether, 0.1418 mL of karsted catalyst and 65.5 g allyl glycidyl ether. Over a period of 1 hour, 135.4 g of pentasiloxane available as MASILWAX BASE from BASF Corporation was added to the reaction mixture as the temperature increased to and was maintained at 50° C. At the completion of the addition, the reaction was held for 2.5 hours, at which time 0.0709 mL of karsted catalyst was added to the reaction mixture and the reaction was monitored by infrared spectroscopy for disappearance of the silicon hydride absorption band (Si—H, 2150 $cm^{-1}$). The temperature was maintained at 50° C. for an additional 2 hours, at which time 60.2 g of diethanolamine was added. The temperature was then increased to 125° C. and held for a period of 2 hours.

Comparative Example 1

This comparative example describes the preparation of a high solids film-forming composition used to form a transparent top coat in a multi-component composite coating. The film-forming composition was prepared from a mixture of the following ingredients:

| Ingredients | Resin Solids | Weight in Grams |
|---|---|---|
| Methyl Amyl Ketone | — | 30.00 |
| TINUVIN 928[1] | 1.50 | 1.50 |
| TINUVIN 328[2] | 1.50 | 1.50 |
| TINUVIN 123[3] | 1.00 | 1.00 |
| Acrylic polyol resin[4] | 50.00 | 71.43 |
| CYMEL 202[5] | 50.00 | 62.50 |
| Polybutylacrylate[6] | 0.30 | 0.50 |
| Acid Catalyst[7] | 1.00 | 1.33 |

[1]2-(2H-Benzotriazol-2-yl)-6-(1-methyl-1-phenylethyl)-4-(1,1,3,3-tetramethylbutyl)phenol UV lightstabilizer available from Ciba-Geigy Corp.
[2]2-(2'-Hydroxy-3',5'-ditert-amylphenyl)benzotriazole UV light stabilizer available from Ciba-Geigy Corp.
[3]Sterically hindered amino ether light stabilizer available from Ciba-Geigy Corp.
[4]Copolymer comprising (18% butyl methacrylate/40% hydroxypropylmethacrylate/1% methyl methacrylate/20% styrene/19% butyl acrylate/2% acrylic acid) 71% solids in a solvent blend of (55% xylene/45% aromatic hydrocarbon)

| Ingredients | Resin Solids | Weight in Grams |
|---|---|---|

[5]High imino, methylated/butylated malamine formaldehyde resin available from CYTEC Industries, Inc.
[6]Polybutylacrylate, 60 percent solids in xylene.
[7]Phenyl acid phosphate, 75 percent solids in isopropanol.

Example 2

This example describes the preparation of a film-forming composition used to form the transparent top coat in the multi-component composite coating compositions of the present invention. The composition contains the chain-extended disiloxane of Example A. The film-forming composition was prepared from a mixture of the following ingredients:

| Ingredients | Resin Solids | Weight in Grams |
|---|---|---|
| Methyl Amyl Ketone | — | 30.00 |
| TINUVIN 928 | 1.50 | 1.50 |
| TINUVIN 328 | 1.50 | 1.50 |
| TINUVIN 123 | 1.00 | 1.00 |
| Polysiloxane of Example A | 50.00 | 51.56 |
| CYMEL 202 | 50.00 | 62.50 |
| Flow additive of Example 1 | 0.30 | 0.50 |
| Acid Catalyst of Example 1 | 1.00 | 1.33 |

Example 3

This example describes the preparation of a film-forming composition of the invention which contains the chain-extended pentasiloxane of Example B. The film-forming composition was prepared from a mixture of the following ingredients:

| Ingredients | Resin Solids | Weight in Grams |
|---|---|---|
| Methyl Amyl Ketone | — | 30.00 |
| TINUVIN 928 | 1.50 | 1.50 |
| TINUVIN 328 | 1.50 | 1.50 |
| TINUVIN 123 | 1.00 | 1.00 |
| Polysiloxane of Example B | 50.00 | 61.05 |
| CYMEL 202 | 50.00 | 62.50 |
| Flow additive of Example 1 | 0.30 | 0.50 |
| Acid Catalyst of Example 1 | 1.00 | 1.33 |

Each of the film-forming compositions of Examples 1 through 3 above were prepared as one-pack systems by sequentially adding the listed ingredients and mixing under mild agitation. Test panels were prepared as described below.

Test Panel Preparation

BWB-5555 black waterborne basecoat (commercially available from PPG Industries, Inc.) was spray applied to steel panels supplied by ACT Laboratories, Inc. which had been pre-coated with ED5000 cationic electrodepositable primer (commercially available from PPG Industries, Inc.) and GPXH5379 Primer Surfacer. The base coated panels were pre-baked for 5 minutes at 200° F. The resulting base coat dry film thickness was approximately 0.6 mils.

Each of the film-forming compositions of Examples 1 through 3 above was spray applied as a transparent top coat to the base coated panels to form thereon a transparent top coat having a dry film thickness of approximately 1.8 mils.

The top coated panels were allowed to "flash" at ambient temperatures for approximately 10 minutes, then thermally cured at 285° F. for 30 minutes. The multi-component composite coatings were tested for various physical properties including gloss, scratch resistance, and hardness.

Test Procedures

Scratch resistance of coated test panel was measured using the following method: Initial 20° gloss of the coated panels was measured using a NOVO-GLOSS 20 statistical glossmeter, available from Paul N. Gardner Company, Inc. Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Ill. Panels were then rinsed with water and carefully patted dry. The 20° specular gloss was measured on the scratched area of each test panel. The number reported is the percent of the initial gloss retained after scratch testing, i.e., 100 X scratched gloss/initial gloss.

Film hardness of the multi-layer composite coatings was measured using a TUKON Hardness tester to determine Knoop Hardness values according to ASTM-D1474-92. A higher reported value indicates a harder coating surface. Test results are provided in the following Table 1.

TABLE 1

| Example | Initial 20° Gloss | % 20° Gloss After Scratch Test | Knoop Hardness |
|---|---|---|---|
| 1 (Comparative) | 96 | 68% | 13.0 |
| 2 | 92 | 93% | 6.0 |
| 3 | 92 | 97% | 10.2 |

The data reported in Table 1 above illustrate that the multi-component composite coating compositions of the invention which contain the chain-extended polysiloxane polyols provide coatings having improved scratch resistance.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A hydroxyl functional organic polysiloxane capable of reacting with a coreactive material to form a curable composition, said polysiloxane comprising the ungelled reaction product of (a) a polysiloxane containing at least two silicon hydride groups;
   (b) a material having two or more unsaturated bonds capable of undergoing a hydrosilation reaction; and
   (c) a material having one reactive unsaturated bond per molecule capable of undergoing a hydrosilation reaction, wherein at least one of (a), (b) and (c) contain at least one hydroxyl group.

2. The hydroxyl functional organic polysiloxane of claim 1 in which (a) has the following structure:

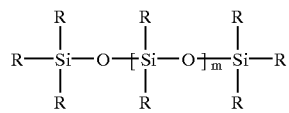

wherein the R groups are independently selected from the group consisting of H and monovalent hydrocarbon groups connected to the silicon atoms, provided that at least two of the groups represented by R and H; and m ranges from 0 to 100, such that the mole percent of hydrogen-bonded silicon atoms to non-hydrogen-bonded silicon atoms ranges from 10 to 100.

3. The hydroxyl functional organic polysiloxane of claim 1 wherein the equivalent ratio of Si—H to total unsaturation capable of undergoing hydrosilation reaction is 0.5 to 2:1.

4. The hydroxyl functional organic polysiloxane of claim 2 wherein m ranges from 0 to 5.

5. The hydroxyl functional organic polysiloxane of claim 1 wherein (b) is a polyallyl compound.

6. The hydroxyl functional organic polysiloxane of claim 5 in which the polyallyl compound is a polyallyl ether.

7. The hydroxyl functional organic polysiloxane of claim 6 in which the polyallyl ether is a hydroxyl functional group containing polyallyl ether.

8. The hydroxyl functional organic polysiloxane of claim 6 in which the polyallyl ether is selected from the group consisting of trimethylolpropane diallyl ether, pentaerythritol diallyl ether, pentaerythritol triallyl ether, Bisphenol A diallyl ether, and mixtures thereof.

9. The hydroxyl functional organic polysiloxane of claim 1 wherein the weight average molecular weight of the hydroxyl functional organic polysiloxane is from 1,000 to 20,000.

10. The hydroxyl functional organic polysiloxane of claim 1 in combination with a coreactive functional material.

11. The hydroxyl functional organic polysiloxane of claim 10 in which the coreactive functional material is a material having isocyanate groups.

12. The hydroxyl functional organic polysiloxane of claim 11 wherein the coreactive functional material is a polyisocyanate.

13. The hydroxyl functional organic polysiloxane of claim 12 wherein the polyisocyanate is selected from the group consisting of diisocyanates, cycloaliphatic polyisocyanates, aromatic polyisocyanates and isocyanate prepolymers.

14. The hydroxyl functional organic polysiloxane of claim 12 wherein the at least some of the polyisocyanates are partially capped.

15. The hydroxyl functional organic polysiloxane of claim 12 wherein the polyisocyanate is selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

16. The hydroxyl functional organic polysiloxane of claim 12 wherein a portion of the polyisocyanate component comprises an isocyanate functional polysiloxane comprising the ungelled reaction product of:

(a) a polysiloxane containing at least two silicon hydride groups;
   (b) a material having two or more unsaturated bonds capable of undergoing a hydrosilation reaction; and (c) a material having one reactive unsaturated bond per molecule capable of undergoing a hydrosilation reaction and which contains an isocyanate group.

17. A hydroxyl functional organic polysiloxane capable of reacting with a coreactive material to form a curable composition, said polysiloxane comprising the following structure:

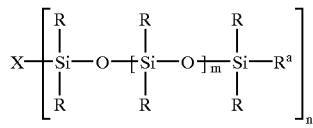

wherein X is an organic linking group, m is 0 to 50, n is 2 or 3, R is a monovalent hydrocarbon group connected to the silicon atoms, and $R^a$ has the following structure:

$R^1$—O—H wherein $R^1$ is alkylene, oxyalkylene or alkylene aryl.

18. The hydroxyl functional organic polysiloxane of claim 17 wherein m ranges from 0 to 5.

19. The hydroxyl functional organic polysiloxane of claim 17 wherein X is derived from a polyallyl compound.

20. The hydroxyl functional organic polysiloxane of claim 19 in which the polyallyl compound is a polyallyl ether.

21. The hydroxyl functional organic polysiloxane of claim 20 in which the polyallyl ether is a hydroxyl functional group containing polyallyl ether.

22. The hydroxyl functional organic polysiloxane of claim 21 in which the polyallyl ether is selected from the group consisting of trimethylolpropane diallyl ether, pentaerythritol diallyl ether, pentaerythritol triallyl ether, Bisphenol A diallyl ether, and mixtures thereof.

23. The hydroxyl functional organic polysiloxane of claim 17 in combination with a coreactive functional material.

24. The hydroxyl functional organic polysiloxane of claim 23 in which the coreactive functional material is a material having isocyanate groups.

25. The hydroxyl functional organic polysiloxane of wherein claim 24 the coreactive functional material is a polyisocyanate.

26. The hydroxyl functional organic polysiloxane of claim 25 wherein the polyisocyanate is one or more compounds selected from the group consisting of diisocyanates, cycloaliphatic polyisocyanates, aromatic polyisocyanates, and isocyanate prepolymers.

27. The hydroxyl functional organic polysiloxane of claim 25 wherein the polyisocyanate is one or more selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

28. The hydroxyl functional organic polysiloxane of claim 25 wherein a portion of the polyisocyanate component comprises an isocyanate functional polysiloxane comprising the ungelled reaction product of:

(a) 1,1,3,3-tetramethyl disiloxane;

(b) one or more hydroxyl functional polyallyl ethers selected form the group consisting of trimethylolpropane diallyl ether, pentaerythritol diallyl ether and pentaerythritol triallyl ether; and (c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;

wherein one or more of the resulting hydroxyl groups has been reacted with one or more compound selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenyene diisocyanate and tolylene diisocyanate.

29. The hydroxyl functional organic polysiloxane of claim 17 wherein the weight average molecular weight of the hydroxyl functional organic polysiloxane is from 1,000 to 20,000.

30. An hydroxyl functional organic polysiloxane comprising one or more of the structures selected from the group consisting of:

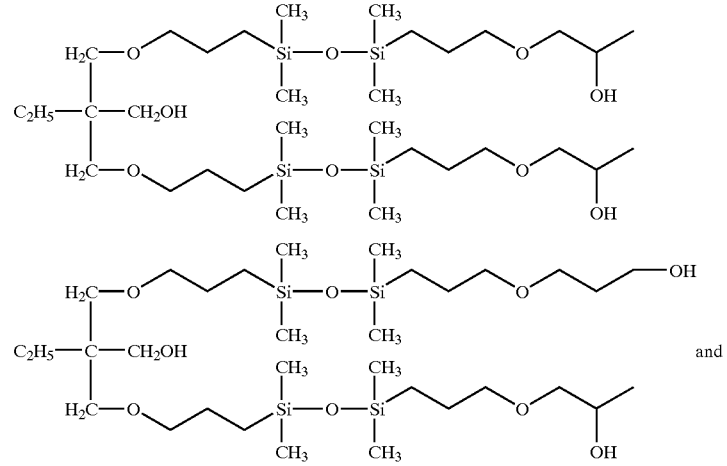

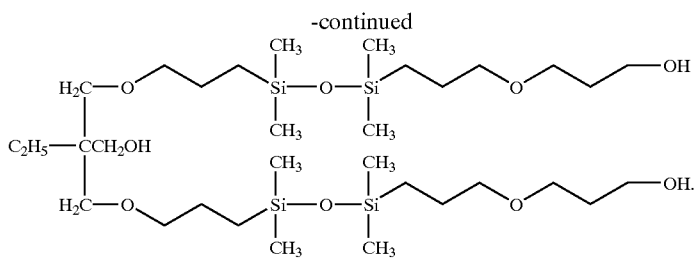

-continued

31. The hydroxyl functional organic polysiloxane of claim 30 in combination with a coreactive functional material.

32. The hydroxyl functional organic polysiloxane of claim 31 in which the coreactive functional material is a material having isocyanate groups.

33. The hydroxyl functional organic polysiloxane of claim 32 wherein the coreactive functional material is a polyisocyanate.

34. The hydroxyl functional organic polysiloxane of claim 33 wherein the polyisocyanate is one or more compound selected from the group consisting of diisocyanates, cycloaliphatic polyisocyanates, aromatic polyisocyanates, and isocyanate prepolymers.

35. The hydroxyl functional organic polysiloxane of claim 33 wherein the polyisocyanate is one or more selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

36. The hydroxyl functional organic polysiloxane of claim 33 wherein a portion of the polyisocyanate component comprises an isocyanate functional polysiloxane comprising the ungelled reaction product of:
  (a) 1,1,3,3-tetramethyl disiloxane;
  (b) one or more hydroxyl functional polyallyl ethers selected from the group consisting of trimethylolpropane diallyl ether, pentaerythritol diallyl ether and pentaerythritol triallyl ether; and
  (c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;
wherein one or more of the resulting hydroxyl groups has been reacted with one or more selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

37. A hydroxyl functional organic polysiloxane capable of reacting with a coreactive material to form a curable composition, said polysiloxane comprising the ungelled reaction product of:
  (a) 1,1,3,3-tetramethyl disiloxane;
  (b) one or more hydroxyl functional polyallyl ethers selected from the group consisting of trimethylolpropane diallyl ether, pentaerythritol diallyl ether and pentaerythritol triallyl ether; and
  (c) one or more mono allyl ethers selected from the group consisting of allyl ether alcohols, allyl alcohols, propoxylated allyl ethers, ethoxylated allyl ethers and allyl glycidyl ether, which are subsequently hydrolyzed.

38. A hydroxyl functional organic polysiloxane capable of reacting with a coreactive material to form a curable composition, said polysiloxane comprising the ungelled reaction product of:
  (a) 1,1,3,3-tetramethyl disiloxane;
  (b) trimethylolpropane diallyl ether; and
  (c) an allyl ether alcohol.

39. A multicomponent composite coating composition comprising:
  (a) a polyol composition comprised of one or more polyols selected from the group consisting of acrylic polyols, polyester polyols, polyurethane polyols, and polyether polyols;
  (b) a hydroxyl functional organic polysiloxane comprised of the ungelled reaction product of 1,1,3,3-tetramethyl disiloxane, trimethylolpropane diallyl ether and an allyl ether alcohol; and
  (c) one or more polyisocyanates.

40. The coating composition of claim 39 wherein the polyisocyanate is one or more selected from the group consisting of diisocyanates, cycloaliphatic polyisocyanates, aromatic polyisocyanates, isocyanurates, and isocyanate prepolymers.

41. The coating composition of claim 40 wherein the polyisocyanate is one or more selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

42. The coating composition of claim 39 wherein a portion of the polyisocyanate comprises an isocyanate functional polysiloxane comprising the ungelled reaction product of:
  (a) 1,1,3,3-tetramethyl disiloxane;
  (b) trimethylolpropane diallyl ether; and
  (c) an allyl ether alcohol;
wherein one or more of the resulting hydroxyl groups has been reacted with one or more polyisocyanate selected from the group consisting of 1,4-tetramethylene diisocyanate, 1,6-hexamethylene diisocyanate, 1,4-cyclohexyl diisocyanate, isophorone diisocyanate, 4,4'-diphenylmethane diisocyanate, 1,3-phenylene diisocyanate, and tolylene diisocyanate.

43. The coating composition of claim 39 wherein the polysiloxane (b) is prepared from 1,1,3,3-tetramethyl disiloxane, trimethylolpropane diallyl ether and an allyl ether alcohol in a molar ratio of 1 to 1.9 to 0.6.

44. A multi-component composite coating composition comprising a base coat deposited from a pigmented film-forming composition and a transparent top coat applied over the base coat in which the transparent top coat is deposited from a film-forming composition comprising:

(a) 2 to 90 weight percent based on weight of total resin solids of an ungelled organic polysiloxane comprising the following structure:

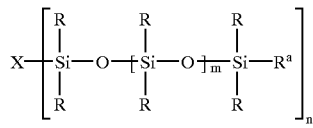

wherein X is an organic linking group, m is 0 to 50, n is 2 or 3, R is a monovalent hydrocarbon group connected to the silicon atoms, and $R^a$ has the following structure:

$R^1$—O—H wherein $R^1$ is alkylene, oxyalkalene or alkylene aryl; and (b) 5 to 65 weight percent based on weight of total resin solids of one or more polyisocyanate curing agents selected from the group consisting of diisocyanates, cycloaliphatic polyisocyanates, aromatic polyisocyanates, and isocyanate prepolymers; and (c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

45. The multi-component composite coating composition of claim 44 wherein a portion of the polyisocyanate curing agent component (b) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and
(c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;
wherein one or more of the resulting hydroxyl groups has been reacted with one or more selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

46. The multi-component composite coating composition of claim 44 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

47. A process for applying a multi-component composite coating to a substrate comprising the following steps:
(a) applying to a substrate a pigmented film-forming composition from which a base coat is deposited onto the substrate; and
(b) applying onto the base coat a film-forming composition from which a transparent top coat is deposited over the base coat, said film-forming composition comprising:

(i) an ungelled organic polysiloxane having functional groups, said polysiloxane comprising the following structure:

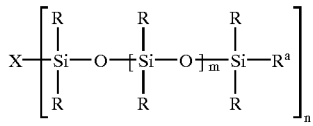

wherein X is an organic linking group, m is 0 to 50, n is 2 or 3, R is a monovalent hydrocarbon group connected to the silicon atoms, and $R^a$ has the following structure:

$R^1$—O—H wherein R' is alkylene, oxyalkalene or alkylene aryl; and (ii) one or more polyisocyanates selected from the group consisting of diisocyanates, cycloaliphatic polyisocyanates, aromatic polyisocyanates, and isocyanate prepolymers.

48. The process for applying a multi-component composite coating of claim 47 wherein a portion of the polyisocyanate component (ii) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and
(c) one or more mono allyl ethers selected from the group consisting of allyl ether alcohols, allyl alcohols, propoxylated allyl ethers, ethoxylated allyl ethers and allyl glycidyl ether that are subsequently hydrolyzed;
wherein one or more of the resulting hydroxyl groups has been reacted with one or more polyisocyanate selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

49. A substrate coated by the process of claim 47.

50. A substrate coated with the multi-component composite coating composition of claim 44.

51. A multi-component composite coating composition comprising a base coat deposited from a pigmented film-forming composition, a first transparent top coat applied over the base coat in which the transparent top coat is deposited from a first film-forming composition, and a second transparent top coat applied over the first transparent top coat in which the second transparent top coat is deposited from a second film-forming composition comprising:

(a) 2 to 90 weight percent based on weight of total resin solids of an ungelled organic polysiloxane having comprising the following structure:

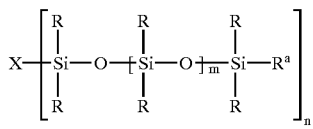

wherein X is an organic linking group, m is 0 to 50 , n is 2 or 3 R is a monovalent hydrocarbon groups connected to the silicon atoms, and $R^a$ has the following structure:

wherein $R^1$ is alkylene, oxyalkalene or alkylene aryl; and (b) 5 to 65 weight percent based on weight of total resin solids of one or more polyisocyanate curing agents selected from the group consisting of diisocyanates, cycloaliphatic polyisocyanates, aromatic polyisocyanates, and isocyanate prepolymers; and (c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

52. The multi-component composite coating composition of claim 51 wherein a portion of the polyisocyanate component (b) comprises an isocyanate functional polysiloxane comprising the ungelled reaction product of:

(a) 1,1,3,3-tetramethyl disiloxane;

(b) one or more hydroxyl functional polyallyl ethers selected from the group consisting of trimethylolpropane diallyl ether, pentaerythritol diallyl ether and pentaerythritol triallyl ether; and (c) one or more mono allyl ethers selected from the group consisting of allyl ether alcohols, allyl alcohols, propoxylated allyl ethers, ethoxylated allyl ethers and allyl glycidyl ethers, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

53. The multi-component composite coating composition of claim 51 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

54. A process for applying a multi-component composite coating to a substrate comprising the following steps:

(a) applying to a substrate a pigmented film-forming composition from which a base coat is deposited onto the substrate;

(b) applying onto the base coat a first top coat film-forming composition from which a transparent top coat is deposited over the base coat; (c) applying onto the first top coat a second film-forming composition from which a second top coat is deposited, said second film-forming composition comprising:

(i) an ungelled organic polysiloxane comprising the following structure:

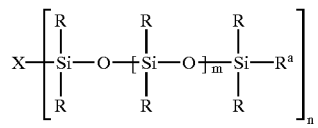

wherein X is an organic linking group, m is 0 to 50, n is 2 or 3, is selected from the group consisting of H, OH and monovalent hydrocarbon groups connected to the silicon atoms, and $R^a$ has the following structure:

wherein $R^1$ is alkylene, oxyalkalene or alkylene aryl; and one or more polyols selected from the group consisting of acrylic polyols, polyester polyols, polyurethane polyols, and polyether polyols; and (ii) one or more polyisocyanates selected from the group consisting of diisocyanates, cycloaliphatic polyisocyanates, aromatic polyisocyanates, and isocyanate prepolymers.

55. The process for applying a multi-component composite coating of claim 54 wherein a portion of the polyisocyanate component (ii) comprises an isocyanate functional polysiloxane comprising the ungelled reaction product of:

(a) 1,1,3,3-tetramethyl disiloxane;

(b) one or more hydroxyl functional polyallyl ethers selected from the group consisting of trimethylolpropane diallyl ether, pentaerythritol diallyl ether and pentaerythritol triallyl ether; and (c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

56. A substrate coated by the process of claim 54.

57. A substrate coated with the multi-component composite coating composition of claim 51.

58. A multi-component composite coating composition comprising a base coat deposited from a pigmented film-forming composition and a transparent top coat applied over the base coat in which the transparent top coat is deposited from a film-forming composition comprising:

(a) 2 to 90 weight percent based on weight of total resin solids of an ungelled organic polysiloxane comprising the ungelled reaction product of:

(i) 1,1,3,3-tetramethyl disiloxane;

(ii) trimethylolpropane diallyl ether; and (iii) an allyl ether alcohol;

(b) 5 to 65 weight percent based on weight of total resin solids of one or more polyisocyanates selected from the group consisting of diisocyanates, cycloaliphatic polyisocyanates, aromatic polyisocyanates, isocyanurates, and isocyanate prepolymers; and (c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

59. The multi-component composite coating composition of claim 58 wherein a portion of the polyisocyanate component (b) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and
(c) one or more mono allyl ethers selected from the group consisting of allyl ether alcohols, allyl alcohols, propoxylated allyl ethers, ethoxylated allyl ethers and allyl glycidyl ethers, which are subsequently hydrolyzed;
wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

60. The multi-component composite coating composition of claim 58 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

61. A process for applying a multi-component composite coating to a substrate comprising the following steps:
(a) applying to a substrate a pigmented film-forming composition from which a base coat is deposited onto the substrate; and
(b) applying onto the base coat a film-forming composition from which a transparent top coat is deposited over the base coat, said film-forming composition comprising:
(i) an ungelled organic polysiloxane having functional groups, said polysiloxane comprising the ungelled reaction product of:
(1) 1,1,3,3-tetramethyl disiloxane;
(2) trimethylolpropane diallyl ether; and
(3) an allyl ether alcohol; and
one or more polyols selected from the group consisting of acrylic polyols, polyester polyols, polyurethane polyols, and polyether polyols; and
(ii) one or more polyisocyanates selected from the group consisting of diisocyanates, cycloaliphatic polyisocyanates, aromatic polyisocyanates, isocyanurates, and isocyanate prepolymers.

62. The process for applying a multi-component composite coating of claim 61 wherein a portion of the polyisocyanate component (ii) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and
(c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;
wherein one or more of the resulting hydroxyl groups has been reacted with one or more polyisocyanate selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

63. A substrate coated by the process of claim 61.

64. A substrate coated with the multi-component composite coating composition of claim 58.

65. A multi-component composite coating composition comprising a base coat deposited from a pigmented film-forming composition, a first transparent top coat applied over the base coat in which the transparent top coat is deposited from a first film-forming composition, and a second transparent top coat applied over the first transparent top coat in which the second transparent top coat is deposited from a second film-forming composition comprising:
(a) 2 to 90 weight percent based on weight of total resin solids of an ungelled organic polysiloxane having functional groups, said polysiloxane comprising the ungelled reaction product of:
(i) 1,1,3,3-tetramethyl disiloxane;
(ii) trimethylolpropane diallyl ether; and
(iii) an allyl ether alcohol;
(b) 5 to 65 weight percent based on weight of total resin solids of one or more polyisocyanates selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate; and
(c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

66. The multi-component composite coating composition of claim 65 wherein a portion of the polyisocyanate component (b) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and
(c) one or more mono allyl ethers selected from the group consisting of allyl ether alcohols, allyl alcohols, propoxylated allyl ethers, ethoxylated allyl ethers and allyl glycidyl ethers, which are subsequently hydrolyzed;
wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

67. The multi-component composite coating composition of claim 66 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

68. A process for applying a multi-component composite coating to a substrate comprising the following steps:
(a) applying to a substrate a pigmented film-forming composition from which a base coat is deposited onto the substrate;
(b) applying onto the base coat a first top coat film-forming composition from which a transparent top coat is deposited over the base coat;
(c) applying onto the first top coat a second film-forming composition from which a second top coat is deposited, said second filmforming composition comprising:
  (i) an ungelled organic polysiloxane having functional groups, said polysiloxane comprising the ungelled reaction product of
    (1) 1,1,3,3-tetramethyl disiloxane;
    (2) trimethylolpropane diallyl ether; and
    (3) an allyl ether alcohol; and one or more polyols selected from the group consisting of acrylic polyols, polyester polyols, polyurethane polyols, polyether polyols; and
  (ii) one or more polyisocyanates selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

(c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

70. A substrate coated by the process of claim 68.

71. A substrate coated with the multi-component composite coating composition of claim 65.

72. A multi-component composite coating composition comprising a base coat deposited from a pigmented film-forming composition and a transparent top coat applied over the base coat in which the transparent top coat is deposited from a film-forming composition comprising:

(a) 2 to 90 weight percent based on weight of total resin solids of an ungelled hydroxyl functional organic polysiloxane comprising one or more of the structures selected from the group consisting of:

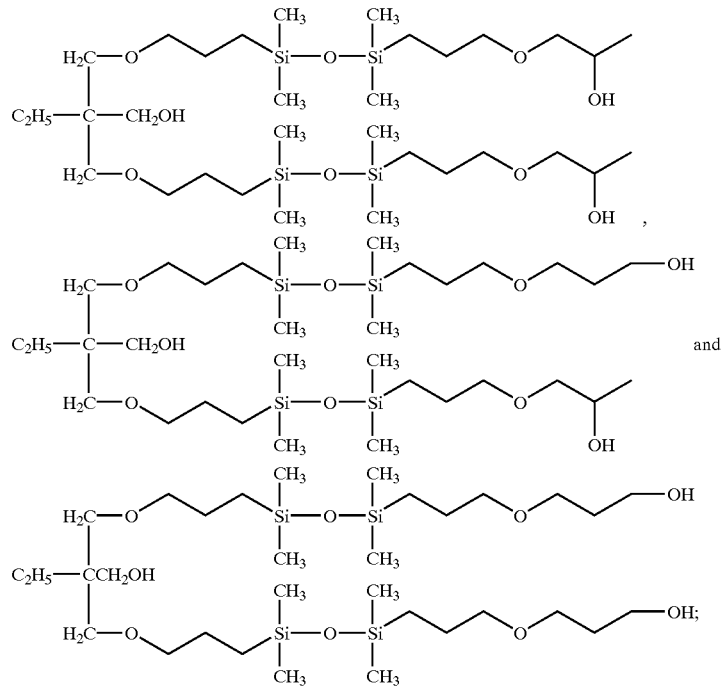

69. The process for applying a multi-component composite coating of claim 68 wherein a portion of the polyisocyanate component (ii) comprises an isocyanate functional polysiloxane comprising the ungelled reaction product of:
(a) 1,1,3,3-tetramethyl disiloxane;
(b) one or more hydroxyl functional polyallyl ethers selected from the group consisting of trimethylolpropane diallyl ether, pentaerythritol diallyl ether and pentaerythritol triallyl ether; and (b) 5 to 65 weight percent based on weight of total resin solids of one or more polyisocyanates selected from the group consisting of diisocyanates, cycloaliphatic polyisocyanates, aromatic polyisocyanates, and isocyanate prepolymers; and
(c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

73. The multi-component composite coating composition of claim 72 wherein a portion of the polyisocyanate component (b) comprises an isocyanate functional polysiloxane comprising the ungelled reaction product of:
  (i) 1,1,3,3-tetramethyl disiloxane;
  (ii) one or more hydroxyl functional polyallyl ethers selected from the group consisting of trimethylolpropane diallyl ether, pentaerythritol diallyl ether and pentaerythritol triallyl ether; and
  (iii) one or more mono allyl ethers selected from the group consisting of allyl ether alcohols, allyl alcohols, propoxylated allyl ethers, ethoxylated allyl ethers and allyl glycidyl ether, which are subsequently hydrolyzed;
wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

74. The multi-component composite coating composition of claim 72 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

75. A process for applying a multi-component composite coating to a substrate comprising the following steps:
  (a) applying to a substrate a pigmented film-forming composition from which a base coat is deposited onto the substrate; and
  (b) applying onto the base coat a film-forming composition from which a transparent top coat is deposited over the base coat, said film-forming composition comprising:
    (i) an ungelled organic polysiloxane comprising one or more of the structures selected from the group consisting of:

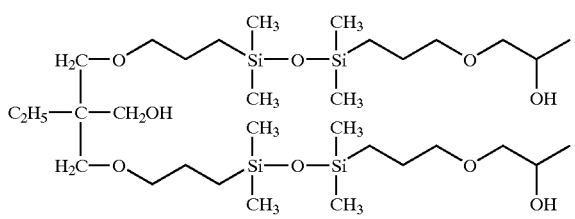

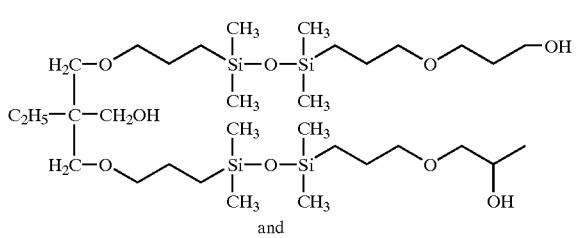
and

-continued

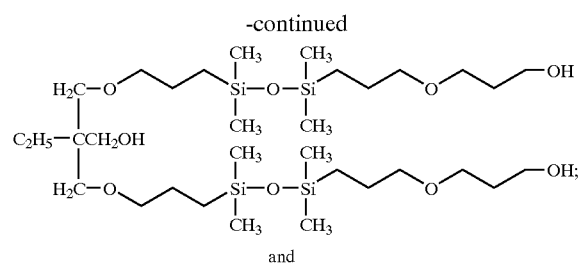
and (ii) one or more polyisocyanates selected from the group consisting of diisocyanates, cycloaliphatic polyisocyanates, aromatic polyisocyanates, and isocyanate prepolymers.

76. The process for applying a multi-component composite coating of claim 75 wherein a portion of the polyisocyanate component (ii) comprises an isocyanate functional polysiloxane comprising the ungelled reaction product of:
  (a) 1,1,3,3-tetramethyl disiloxane;
  (b) one or more hydroxyl functional polyallyl ethers selected from the group consisting of trimethylolpropane diallyl ether, pentaerythritol diallyl ether and pentaerythritol triallyl ether; and
  (c) one or more mono allyl ethers selected from the group consisting of allyl ether alcohols, allyl alcohols, propoxylated allyl ethers, ethoxylated allyl ethers and allyl glycidyl ethers, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

77. A substrate coated by the process of claim 75.

78. A substrate coated with the multi-component composite coating composition of claim 72.

79. A multi-component composite coating composition comprising a base coat deposited from a pigmented film-forming composition, a first transparent top coat applied over the base coat in which the transparent top coat is deposited from a first film-forming composition, and a second transparent top coat applied over the first transparent top coat in which the second transparent top coat is deposited from a second film forming composition comprising:

(a) 2 to 90 weight percent based on weight of total resin solids of an ungelled organic polysiloxane comprising one or more of the structures selected from the group consisting of:

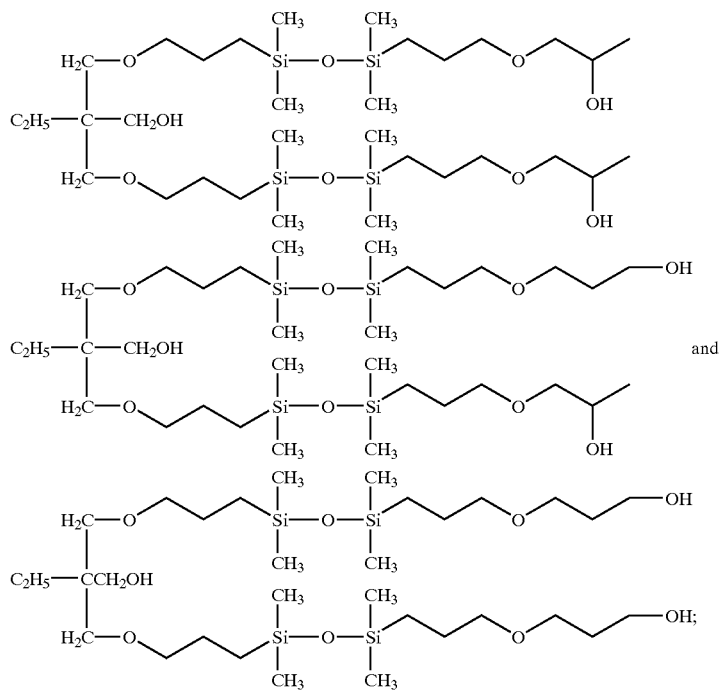

and (b) 5 to 65 weight percent based on weight of total resin solids of one or more polyisocyanates selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate; and (c) 0 to 80 weight percent based on weight of total resin solids of one or more polyols selected from the group consisting of acrylic polyols, polyester polyols, polyurethane polyols and polyether polyols; whereas the total weight of (a), (b) and (c) is 100 percent by weight based on weight of total resin solids.

80. The multi-component composite coating composition of claim 79 wherein a portion of the polyisocyanate component (b) comprises an isocyanate functional polysiloxane comprising the ungelled reaction product of:

(a) 1,1,3,3-tetramethyl disiloxane;

(b) one or more hydroxyl functional polyallyl ethers selected from the group consisting of trimethylolpropane diallyl ether, pentaerythritol diallyl ether and pentaerythritol triallyl ether; and (c) one or more mono allyl ethers selected from the group consisting of allyl ether alcohols, allyl alcohols, propoxylated allyl ethers, ethoxylated allyl ethers and allyl glycidyl ethers, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

81. The multi-component composite coating composition of claim 79 wherein the polysiloxane component (a) is present at from 20 to 80 weight percent based on weight of total resin solids; the polyisocyanate component (b) is present at from 10 to 45 weight percent based on weight of total resin solids; and the polyol component (c) is present at from 10 to 50 weight percent based on weight of total resin solids; whereas the total weight of (a), (b) and (c) is 100 percent by weight based on weight of total resin solids.

82. A process for applying a multi-component composite coating to a substrate comprising the following steps:

(a) applying to a substrate a pigmented film-forming composition from which a base coat is deposited onto the substrate;

(b) applying onto the base coat a first top coat film-forming composition from which a transparent top coat is deposited over the base coat;

(c) applying onto the first top coat a second film-forming composition from which a second top coat is deposited, said second film-forming composition comprising:

(i) an ungelled organic polysiloxane comprising one or more of the structures selected from the group consisting of:

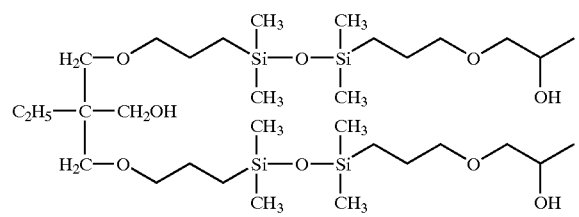

-continued

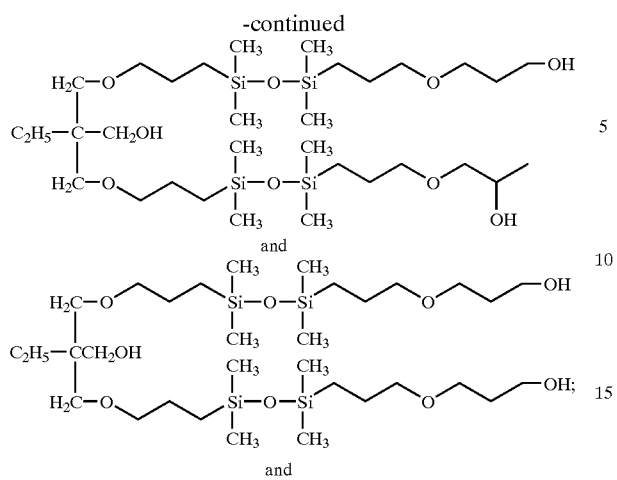
and one or more polyols selected from the group consisting of acrylic polyols, polyester polyols, polyurethane polyols, polyether polyols; and (ii) one or more polyisocyanates selected from the group consisting of polyurethane polymers containing terminal isocyanate groups; polyureas containing terminal isocyanate groups; 4,4'-diphenylmethane diisocyanate; 1,3-phenylene diisocyanate; toluene diisocyanate; 1,4-tetramethylene diisocyanate; 1,6-hexamethylene diisocyanate; 1,4-cyclohexyl diisocyanate; isophorone diisocyanate; and α,α-xylylene diisocyanate.

83. The process for applying a multi-component composite coating of claim 82 wherein a portion of the polyisocyanate component (ii) comprises an isocyanate functional polysiloxane comprising the ungelled reaction product of:

(a) 1,1,3,3-tetramethyl disiloxane;

(b) one or more hydroxyl functional polyallyl ethers selected from the group consisting of trimethylolpropane diallyl ether, pentaerythritol diallyl ether and pentaerythritol triallyl ether; and (c) one or more mono allyl ethers selected from the group consisting of allyl ether alcohols, allyl alcohols, propoxylated allyl ethers, ethoxylated allyl ethers and allyl glycidyl ether, which are subsequently hydrolyzed;

wherein one or more of the resulting hydroxyl groups has been reacted with one or more polyisocyanates selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-diphenylmethane diisocyanate, 1,3-phenylene diisocyanate and tolylene diisocyanate.

84. A substrate coated by the process of claim 82.

85. A substrate coated with the multi-component composite coating composition of claim 79.

* * * * *